United States Patent [19]

Anada et al.

[11] Patent Number: 5,306,089
[45] Date of Patent: Apr. 26, 1994

[54] LINEAR MOTION ROLLING GUIDE UNIT

[75] Inventors: Katsuya Anada; Yasumasa Ooya, both of Gifu, Japan

[73] Assignee: Nippon Thompson Co., Ltd., Tokyo, Japan

[21] Appl. No.: 10,862

[22] Filed: Jan. 29, 1993

[30] Foreign Application Priority Data

Jan. 31, 1992 [JP] Japan .................. 4-40717

[51] Int. Cl.$^5$ .............................................. F16C 29/06
[52] U.S. Cl. ........................................ 384/45; 384/15
[58] Field of Search ................ 384/15, 45, 43, 44; 464/168

[56] References Cited

U.S. PATENT DOCUMENTS

| 4,921,358 | 5/1990 | Kasnga et al. | 384/15 |
| 5,092,685 | 3/1992 | Tonogai | 384/15 |
| 5,139,347 | 8/1992 | Hattori | 384/45 |

FOREIGN PATENT DOCUMENTS 1-112021 4/1989 Japan.

Primary Examiner—Lenard A. Footland
Attorney, Agent, or Firm—Browdy and Neimark

[57] ABSTRACT

In the linear motion rolling guide unit according to this invention, the under seal is made up of a metal core member and a seal member. The metal core member is formed with a through-hole through which to insert a bolt. When the table is mounted on the casings, the bolts can be easily passed through the under seal by cutting a part of the seal member that corresponds in position to the through-hole in the core member. Therefore, in mounting the table to the casings, it is possible to apply a single kind of under seal to both types of structure—the top bolt insertion construction and the bottom bolt insertion construction —thus permitting the common use of components among the two constructions and reducing cost.

8 Claims, 3 Drawing Sheets

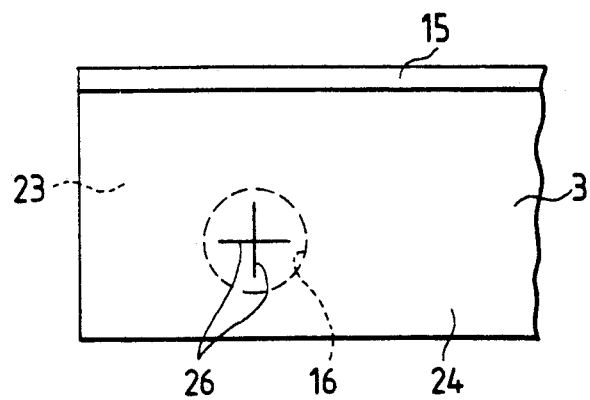
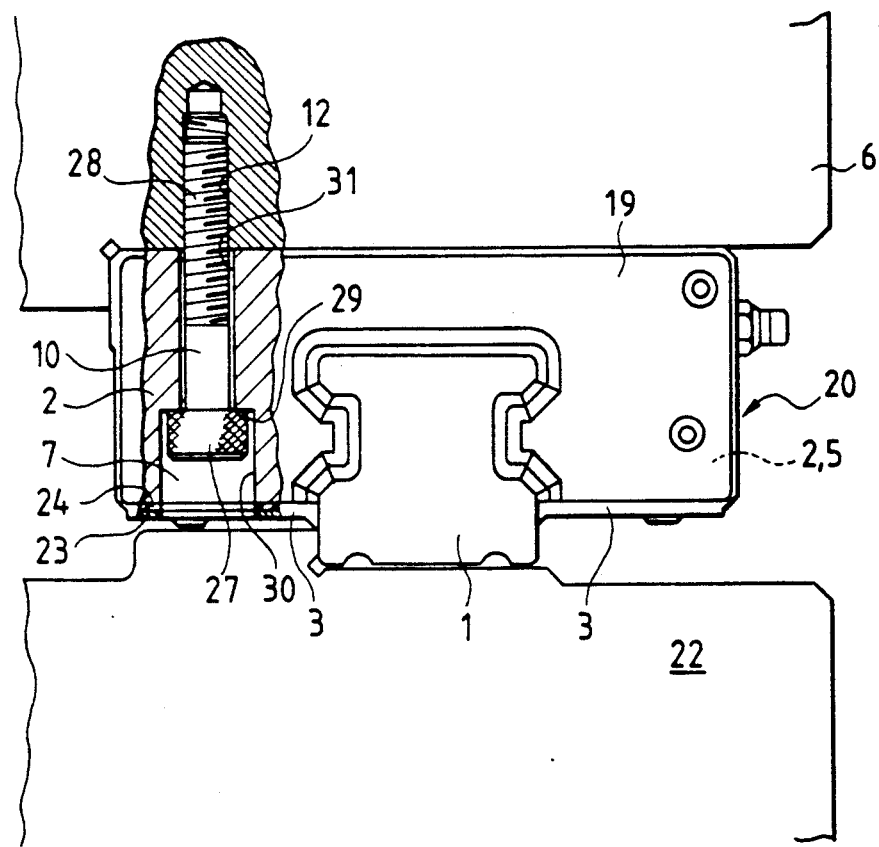

LINEAR MOTION ROLLING GUIDE UNIT

BACKGROUND OF THE INVENTION

1. Field of the Invention

The present invention relates to a linear motion rolling guide unit which is applied to sliding portions of machining tools and various processing equipment and which consists of a track rail with raceway grooves formed longitudinally extending on both side walls thereof, a casing saddling the track rail and having raceway grooves, and a number of rolling elements that roll between the facing raceway grooves.

2. Description of the Prior Art

In a conventional linear motion rolling guide unit, when a slider slides on a track rail, the seal between the slider and the track rail is provided by end seals mounted at both ends of the slider and an under seal mounted to the underside of the slider.

A linear motion rolling guide unit as shown in FIG. 8 has been disclosed. FIG. 8 is a perspective view showing one example of a conventional linear motion rolling guide unit. As shown in the figure, the linear motion rolling guide unit consists mainly of a track rail 1 with raceway surfaces 9 formed longitudinally extending on both side walls thereof and a slider 20 slidably mounted astride the track rail 1. The slider 20 is slidable relative to the track rail 1 and consists of a casing 2 having raceway surfaces 8 formed at positions facing the raceway surfaces 9, a number of rolling elements or balls 4, which are trapped between the opposing raceway surfaces 8, 9 to allow relative motion between the rail and the casing, and end caps 5 attached to the longitudinal ends of the casing 2.

The end cap 5 is fitted with an end seal 19 that provides a seal between the track rail 1 and the slider 20. The end cap 5 also has a grease nipple 18 for supplying lubricant to the sliding surface between the track rail 1 and the slider 20. To prevent the balls 4 from coming off the casing 2, a ball retaining band 17 is fitted into the casing 2 so as to enclose the balls 4. The casing 2 is provided with an under seal 3 to reliably prevent the balls 4 from coming off the casing 2 and to seal the casing 2, the longitudinal side walls 11 of the track rail 1 and the underside of the casing 2.

The slider 20 is mounted astride the rail 1 and is freely slidable on the rail 1 because of a number of balls 4 that circulate along the raceway surfaces 9 of the rail 1. That is, the balls 4 in a loaded region, i.e. those traveling on the raceway surafce 9 of the track rail 1, are led into a direction changing passage formed in the end cap 5 and further into a return passage 21 formed parallel to the raceway surface 8 in the upper part of the casing 2, so that the rolling elements 4 circulate in an endless raceway. As the balls 4 trapped between the raceway surface 8 formed in the slider 20 and the raceway surface 9 formed on the rail 1 roll under load, the slider 20 can freely move relative to the rail 1.

The under seal 3 is simple in shape and thus can be manufactured easily. However, the under seal 3 has the drawback of being easily deformed by external force when there are positioning errors of the casing 2 and the track rail 1 because it is formed of a thin plate. To describe in more detail, when the slider 20 slides on the track rail 1, any temperature variations and swelling by lubricant of the under seal 3 will deform the under seal 3 itself degrading its sealing performance. Further, the balls 4 may make contact with the under seal 3, increasing the sliding resistance.

The linear motion rolling guide unit as mentioned above is disclosed in the Japanese Patent Laid-Open No. 112021/1989. In another example the under seal is made up of a metal core member and a seal member fixed to the core member to keep the original shape of the under seal.

Generally, the linear motion rolling guide unit has a table securely mounted on a plurality of sliders (usually four) so that an equipment may be placed on the table. Example methods of mounting the table on the sliders are shown in FIGS. 6 and 7. FIG. 6 is a partially cutaway view showing one example method of mounting the table on the sliders; and FIG. 7 is a partially cutaway view showing another method of mounting the table on the sliders. In FIGS. 6 and 7 components having the same functions as those in FIG. 8 are given like reference numerals.

FIG. 6 shows one example of a four-raceway endless linear motion rolling guide unit. In this rolling guide unit, the slider 20 is shown to have mounting holes, through which bolts are screwed from under, with the table 6 mounted on the sliders 20. The track rail 1 is secured to the bed 22 by bolts. Normally, a pair of track rails 1 run parallel to each other, secured to the bed 22 by bolts. Two sliders 20 are slidably mounted on each track rail 1 and the table 6 is supported on four sliders 20 mounted on the two track rails 1. The casing 5 of the slider 20 has mounting holes 7, through which bolts are inserted from under. The table 6 is formed with threaded mounting holes 12. With the table 6 placed on the sliders 20, bolts 10 are inserted from under into the mounting holes 7 in the casing 2 and screwed into the threaded mounting holes 12 of the table 6 to fix the table 6 to the sliders 20.

FIG. 7 shows another example of the four-raceway endless linear motion rolling guide unit. In this example, a slider 20 is shown to have mounting holes through which bolts are inserted from above, with the table 6 mounted on the sliders. This example is similar to the one shown in FIG. 6 except for the table mounting method. The casing 2 of the slider 20 is formed with threaded mounting holes 13 on the upper side. The table 6 is formed with mounting holes through which bolts are inserted from above. With the table 6 mounted on the sliders 20, bolts 10 are inserted from above into the mounting holes 14 in the table and screwed into the threaded mounting holes 13 in the casing, thus securing the table 6 to the sliders 20.

Let us consider a case where the under seal 3 is made up of a metal core member and a plastic sealing member fixed to the core member. In the linear motion rolling guide unit of FIG. 6, when the under seal 3 is fixed to the casing 2, it is necessary to form through-holes in the under seal 3 through which to insert the bolts 10 because the casings 2 are secured to the table 6 by bolts 10. On the other hand, in the linear motion rolling guide unit as shown in FIG. 7 where the table 6 is secured to the casings 2 by bolts 10, since the bolts 10 are not passed through the under seal 3, it is not necessary to form the through-holes in the under seal 3 for the bolts 10.

That is, in the linear motion rolling guide unit of FIG. 6, the through-holes for the bolts 10 must be formed in the under seal 3. In the linear motion rolling guide unit of FIG. 7, on the other hand, there is no need to form through-holes in the under seal 3. It should be noted, however, that the under seal 3 is required to seal the gap between the track rail 1 and the slider 20 to prevent ingress of dirt, water and other foreign matters. Hence, it is desired that the under seal 3 is not formed with through-holes. To solve this problem, it is necessary to form two kinds of under seal 3.

SUMMARY OF THE INVENTION

A primary object of this invention is to solve the above-mentioned problems and to provide a linear motion rolling guide unit, which is characterized in: that the gap between the track rail and the slider is sealed by an under seal which is made up of a metal core member and a seal member fixed to the core member; that through-holes through which to pass bolts to secure the table to the sliders are formed beforehand in the core member; that the seal member is fixed to the core member, so that in mounting the table on the casings of the sliders, two types of bolt insertion—top insertion and bottom insertion—can be dealt with by one kind of under seal, permitting common use of components among the linear motion rolling guide units with different types of bolt insertion, reducing cost significantly, and ensuring the maximum sealing performance of the under seal.

In a linear motion rolling guide unit, which consists of: a track rail having raceway surfaces formed longitudinally extending on both side walls thereof; a slider made up of a casing and end caps, the casing being slidable relative to the rail, the casing having raceway surfaces formed therein at positions facing the track rail raceway surfaces, the end caps being attached to the longitudinal ends of the casing; under seals attached to the underside of the slider; a number of rolling elements circulating through a raceway between the facing raceway surfaces; and a table mounted on and secured to the casings by fastenings, it is an object of this invention to provide a linear motion rolling guide unit in which the under seal is made up of a metal core member and a seal member secured to the core member, in which through-holes are formed in the core member so that the fastenings can be passed therethrough, and in which the fastenings are passed through those parts of the seal member that correspond to the through-holes in the core member so as to secure the table to the casings.

Another object of this invention is to provide a linear motion rolling guide unit, in which when the casing of the slider is formed with bottom mounting holes through which the bolts are passed from under to secure the table to the casings, those portions of the seal members corresponding in position to the through-holes in the core members of the under seals are cut off or formed with a cut to allow the bolts to be easily passed through the under seals so as to secure the table to the casings with the bolts.

A further object of this invention is to provide a linear motion rolling guide unit, in which when the table is formed with top mounting holes through which the bolts are passed from above to secure the table to the casings with the bolts, there is no need to cut off or make a cut in those portions of the seal members of the under seals that correspond in position to the through-holes in the core members, making it possible to prevent the appearance of the under seals from being impaired, seal the gaps between the track rail, the casing and the end caps to prevent ingress of foreign matters such as dust onto the sliding surfaces, and thereby ensure a good sealing function.

In this linear motion rolling guide unit, the under seals may have projections formed integral with the seal members that fit into the through-holes in the core members, or may have no projection in the seal members so that the through-holes in the core members will remain hollow. When the through-holes in the core members are left hollow, those portions of the seal members that correspond to the through-holes are thin, making the process of cutting off or forming a cut in those portions of the seal members very easy. If the sealing members are formed with a cut, for example a cross cut, it is possible to secure the sealing function to some extent without impairing the appearance of the under seals even after the fastenings are passed through the through-holes.

BRIEF DESCRIPTION OF THE DRAWINGS

FIG. 5 is a plan view of still another example of the under seal;

FIG. 6 is a partial cutaway view of the linear motion rolling guide unit of this invention showing one method of mounting the table on the casing;

DETAILED DESCRIPTION OF EMBODIMENTS

Figure 1:
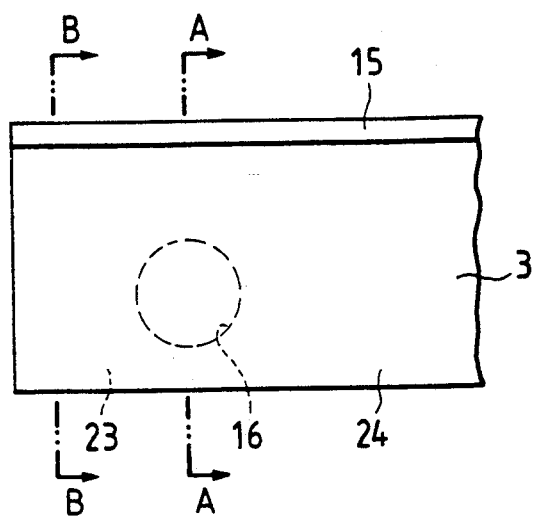
FIG. 1 is a plan view of an example under seal incorporated into the linear motion rolling guide unit of this invention.

Embodiments of the linear motion rolling guide unit according to this invention will be described by referring to FIGS. 1, 2 and 3. In these figures, components having the same functions as those shown in FIG. 8 are given like reference numerals.

Figure 8:
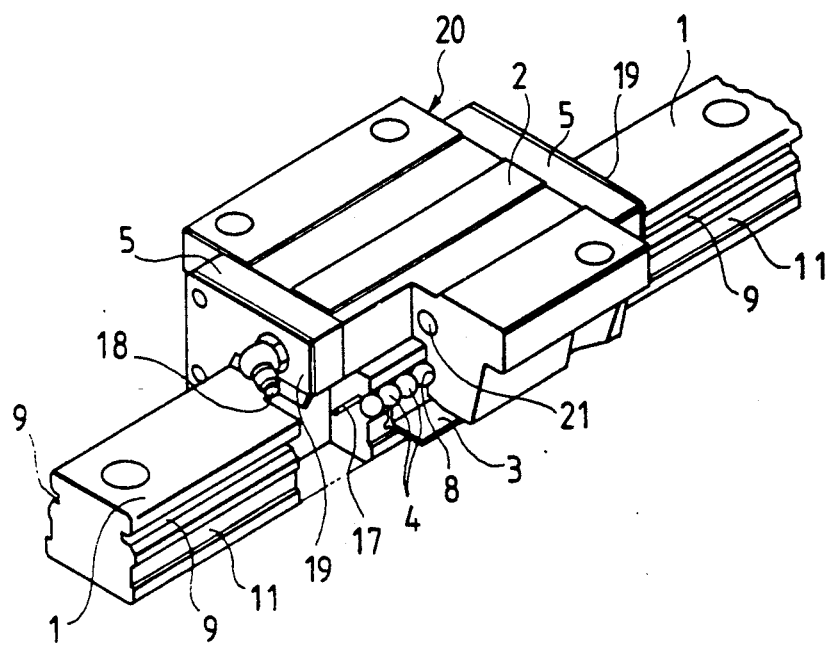
FIG. 8 is a perspective view of a conventional linear motion rolling guide unit.

The linear motion rolling guide unit of this invention has basically the same construction as that shown in FIG. 8 except that it has a novel feature with the construction of the under seal 3. The following description will also refer to FIG. 8. The linear motion rolling guide unit consists of a track rail 1 having raceway surfaces 9 formed longitudinally extending on both side walls 11 thereof and a slider 20 that can be moved relative to the track rail 1. The slider 20 is slidable on the track rail 1 and consists of: a casing 2 having raceway surfaces 8 formed therein at positions facing the track rail raceway surfaces 9; a number of rolling elements 4 circulating in a raceway between the facing raceway surfaces 8 and 9 to allow relative motion between the casing 2 and the track rail 1; end caps 5 attached to the longitudinal ends of the casing 2; side seals 19 attached to the ends of the end caps 5; and under seals 3 attached to the undersides of the casing 2, and the end caps 5 or the side seals 19.

Figure 2:
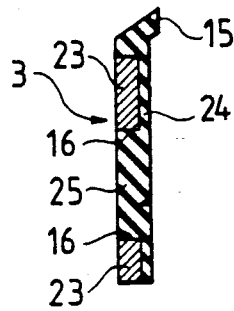
FIG. 2 is a cross section taken along the line A—A of FIG. 1.
Figure 3:
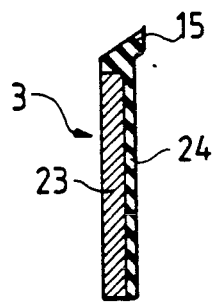
FIG. 3 is a cross section taken along the line B—B of FIG. 1.

FIGS. 1, 2 and 3 show the under seal 3 that is removably attached to the slider 20, which is incorporated into the linear motion rolling guide unit and which consists of the casing 2 and the end caps 5. The under seal 3 consists of a metal core member 23 and a seal member 24 fixed to the core member 23 over the entire surface. The seal member 24 is formed of a resilient material such as plastics and rubber that has a sealing function. In the under seal 3, it is no matter which of the core member 23 and the seal member 24 is upper side and, therefore any one of the core member 23 and seal member 23 may be in contact with both of the casing 2 and the end cap 5. The seal member 24 has a lip member 15 on one side that projects toward the track rail 1 to engage it. It is noted that the extended direction of the lip member 15 is not limited and it is only required that the lip member 15 is in engagement with the track rail 1.

The core member 23 of the under seal S, as shown in FIG. 2, is formed with a through-hole 10 through which to pass a bolt 10 (see FIG. 6) to secure the table 6 to the casing 2. A projecting portion 25 of the sealing member 24 fits into the through-hole 16 so that the area near the mounting hole in the under seal 3 is formed flat. The portion of the core member 23 of the under seal 3 where the bolt 10 does not pass is provided with the seal member 24 over the entire surface.

In the linear motion rolling guide unit of FIG. 6, the casing 5 of the slider 20 is formed with mounting holes 7 through which to insert the bolts 10 from under. The table 6 is formed with threaded mounting holes 12 at positions corresponding to the mounting holes 7 of the casing 5. The bolt 10 consists of a large-diameter head portion 27 and a small-diameter threaded rod portion 28. The mounting hole 7 is made up of a lower large-diameter hole 30 where the bolt head portion 27 is situated and an upper small-diameter hole 31 through which the threaded rod portion 28 passes. At the boundary between the large-diameter hole 30 and the small-diameter hole 31 is formed a step portion 29 with which the bolt head portion 27 engages.

In this type of linear motion rolling guide unit, when the table 6 is mounted on the sliders 20, only the projecting portion 25 of the seal member 24 that corresponds to the through-hole 16 formed in the core member 23 of the under seal 3 is cut off. The bolt 10 is passed through the through-hole 16 in the under seal 3 and then through the bottom mounting hole 7 in the casing 2. The threaded rod portion 28 of the bolt 10 is then screwed into the threaded mounting hole 12 in the table 6. As a result, the head portion 27 of the bolt 10 is pressed against the step portion 29 with the threaded rod portion 28 fastened to the threaded mounting hole 12, thereby securely fixing the table 6 to the sliders 20. Since the seal member 24 of the under seal 3 is formed of elastic soft material such as rubber and plastics and the core member 23 is formed with through-holes 16 beforehand, it is possible to easily cut off the projecting portion 25 of the seal member 24 with a knife, facilitating the table mounting process.

Figure 7:
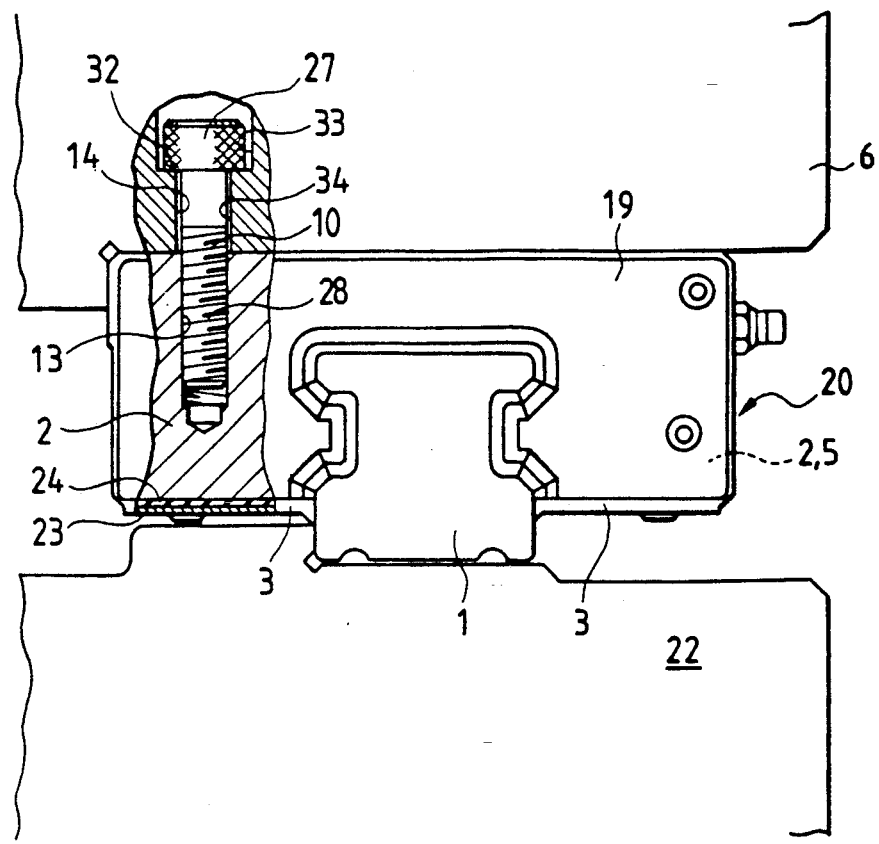
FIG. 7 is a partial cutaway view of the linear motion rolling guide unit of this invention showing another method of mounting the table on the casing.

In the linear motion rolling guide unit shown in FIG. 7, the casing 2 of the slider 20 is formed at the upper side with threaded mounting holes 13 into which the threaded rod 28 of the bolt 10 is screwed. The table 6 is formed with top mounting holes 14. The mounting hole 14 consists of an upper large-diameter hole 33 where the head portion 27 of the bolt 10 is situated and a lower small-diameter hole 34 through which the threaded rod portion 28 is passed. At the boundary between the large-diameter hole 33 and the small-diameter hole 34 is formed a step portion 32 with which the bolt head portion 27 engages.

In this type of linear motion rolling guide unit, there is no need to pass the bolt 10 through the under seal 3 and therefore cut off the projecting portion 25 of the seal member 24 of the under seal 3. This facilitates the table mounting procedure. That is, the table 6 can be mounted on the sliders 20 simply by passing the bolt 10 from above through the mounting hole 14 in the table 6, screwing the threaded rod portion 28 of the bolt 10 into the threaded mounting hole 13 in the casing 2. As a result, the head portion 27 of the bolt is pressed against the step portion 32 with the threaded rod portion 28 fastened to the threaded mounting hole 13, thereby rigidly securing the table 6 to the sliders 20. Since the projecting portion 25 of the seal member 24 that corresponds in position to the through-hole 16 of the core member 23 is not cut off, the under seal 3 can be protected from being impaired in appearance and be kept in good sealing condition.

Therefore, the under seal 3 of this linear motion rolling guide unit can be applied to either method of mounting the table 6 on the casing 2. When it is desired to increase the number of locations where the bolts 10 are used to secure the table 6 to the casings 2, it is only necessary during the hole making process to form an excess number of through-holes 16 in the core member 23 of the under seal 3. This eliminates the need to perform an additional hole drilling work on the core member 23.

Figure 4:
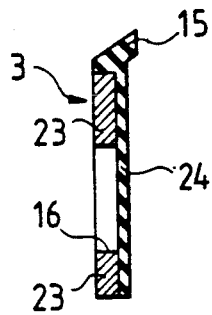
FIG. 4 is a cross section of another example of the under seal taken along the line A—A of FIG. 1.

Next, by referring to FIG. 4 a further embodiment of the linear motion rolling guide unit will be described. This embodiment is similar in construction to the previous embodiment except for the under seal structure, and the identical components are assigned like reference numerals. The under seal 3 of this embodiment is not provided with a projecting portion 25 at the seal member 24, which in the previous embodiment fits into the through-hole 16 of the core member 23. That is, the core member 23 is bonded at one side with the seal member 24 of uniform thickness, with the through-hole portion in the core member 23 left hollow.

By referring to FIG. 5, a still another embodiment of the linear motion rolling guide unit will be explained. This embodiment is similar in construction to the embodiments of FIG. 1 and FIG. 4 except that the cut structure of the under seal differs from those of the previous embodiments. Identical components are given like reference numerals. The under seal 3 of this embodiment is characterized in that a portion of the seal member 24 that corresponds to the through-hole 16 formed in the core member 23 is formed with a cross cut 26 so as to allow the bolt 10 to pass therethrough. This cut in the seal member 24 at a position corresponding to the through-hole facilitates the insertion of the bolt 10.

We claim:
1. A linear motion rolling guide unit comprising:
a track rail having raceway surface formed longitudinally extending on both side walls thereof;
a casing saddling the track rail and being able to slide relative to the track rail, the casing having raceway surfaces formed therein at positions facing the track rail raceway surfaces;
end caps mounted to both ends of the casing;
a slider consisting of the casing and the end caps;
a table secured to the casings by fastenings;
under seals attached to the underside of the slider;
a number of rolling elements rolling so as to circulate through raceways defined by the track rail raceway surfaces and the casing raceway surfaces;
the under seals each consisting of a metal core member and a seal member fixed to one side of the metal core member, the seal member being formed of a soft elastic material having a sealing function;

the core members having through-holes through which to pass the fastenings; and the seal members covering the through-holes in the core members, parts of the seal members being cut at positions corresponding to the through-holes of the core members so that the fastenings can be passed through the cut portions of the seal members when the table is mounted on the casings.

2. A linear motion rolling guide unit as claimed in claim 1, wherein the portions of the seal members corresponding to the through-holes in the core members are formed as projections that fill the through-holes.

3. A linear motion rolling guide unit as claimed in claim 1, wherein the portions of the seal members corresponding to the through-holes in the core members have the same thickness as other parts of the seal members secured to the core members.

4. A linear motion rolling guide unit as claimed in claim 1, wherein the portions of the seal members corresponding to the through-holes in the core members cover the through-holes and are formed with a cut so that the fastenings can be passed through the cut portions of the seal members.

5. A linear motion rolling guide unit as claimed in claim 1, wherein the under seals have a lip portion formed integral with the seal member that extend longitudinally on a side facing the track rail, the lip portion being in contact with the side wall of the track rail.

6. A linear motion rolling guide unit as claimed in claim 1, wherein the fastenings are bolts.

7. A linear motion rolling guide unit as claimed in claim 6, wherein the casing is formed at the underside with insertion holes through which the holes can be inserted, the table is formed with threaded holes at positions corresponding to the insertion holes in the casing, and the table is secured to the casings by passing the bolts through the seal members at portions corresponding to the through-holes of the core members and screwing the bolts into the threaded holes.

8. A linear motion rolling guide unit as claimed in claim 6, wherein the casing is formed at the upper side with threaded mounting holes into which the threaded rod portions of the bolts are to be screwed, the table is formed at the upper side with bolt insertion holes, and the table is secured to the casings by inserting the bolts through the insertion holes in the table and screwing the bolts into the threaded mounting holes in the casing, without cutting the portions of the seal members corresponding to the through-holes in the core members and without inserting the bolts through the cut portions.

* * * * *